United States Patent Office 2,723,249
Patented Nov. 8, 1955

2,723,249

PHENOL-ALDEHYDE RESINS REACTED WITH PHENYL GLYCIDYL ETHER

Melvin De Groote, University City, Mo., assignor to Petrolite Corporation, Wilmington, Del., a corporation of Delaware No Drawing. Application November 19, 1952,
Serial No. 321,493

11 Claims. (Cl. 260—58)

The preparation of oxyalkylation-susceptible, fusible, organic solvent-soluble, water-insoluble, phenol-aldehyde resins is well known. Such resins may be derived by reaction between a difunctional monohydric phenol and an aldehyde having not over 8 carbon atoms and reactive toward said phenol. One procedure produces the resin in the substantial absence of trifunctional phenols and employs a phenol of the formula

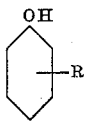

in which R is a hydrocarbon radical having not more than 24 carbon atoms and substituted in the 2,4,6 position. Such phenols are described, for example, in U. S. Patents Nos. 2,499,365, 2,499,367, 2,499,368, and 2,499,370, all dated March 7, 1950, to De Groote et al.

Aforementioned U. S. Patent No. 2,499,368 describes an oxyalkylation-susceptible, fusible, organic solvent-soluble, water-insoluble, phenol-aldehyde resin which is derived by reaction between a difunctional monohydric phenol and an aldehyde having not over 8 carbon atoms and reactive toward said phenol; said resin being formed in the substantial absence of trifunctional phenols; said phenol being of the formula

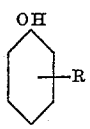

in which R is a hydrocarbon radical having not more than 24 carbon atoms and substituted in the 2,4,6 position.

U. S. Patent No. 2,499,370 describes an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

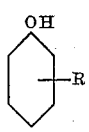

in which R is a hydrocarbon radical having at least 4 and not more than 12 carbon atoms and substituted in the 2,4,6 position.

The present invention preferably involves the use of a phenol-aldehyde resin of the kind just described, with the proviso that the hydrocarbon radical shall have at least 4 and not over 18 carbon atoms.

More specifically, my invention is concerned with the process of reacting a glycidyl phenyl ether of the kind subsequently described with an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

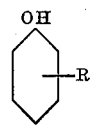

in which R is a hydrocarbon radical having not more than 24 carbon atoms and substituted in the 2,4,6 position.

The present invention is concerned with the modification of such resins which involves the introduction of (a) a phenolic nucleus which may or may not be substituted, (b) conversion of the hydroxyl into an ether linkage, and (c) the introduction of an alkanol hydroxyl radical as differentiated from a phenolic hydroxyl radical. Actually, both types of hydroxyl radicals may be present as indicated subsequently. This is accomplished by reacting the resin with a substituted alkylene oxide, to wit, glycidyl phenyl ether or derivatives which, in turn, are obtained from substituted phenols as differentiated from an unsubstituted phenolic nucleus.

The production of glycidyl phenyl ethers is well known and has been described in the literature as, for example, in U. S. Patent No. 2,181,100, dated November 21, 1939, to Slagh et al. The procedure can be employed in connection with cyclohexanol or substituted cyclohexanol. In any event, such glycidyl phenyl ethers can be indicated by the following formula:

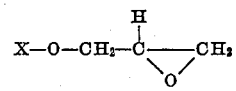

where XOH represents a member of the class selected from phenol and substituted phenols. The specific formula for glycidyl phenyl ether is, of course,

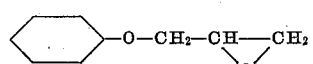

The substituted phenol employed may be ortho-substituted, para-substituted, or meta-substituted. Examples of meta-substituted products include metacresol and cardanol and hydrogenated cardanol. Para-substituted products include para-cresol, paraethylphenol, parabutylphenol, paraamylphenol, paraoctylphenol, paranonylphenol, paradecylphenol, paradodecylphenol, etc., as well as paracyclohexylphenol, parabenzylphenol, and paraphenylphenol. The orthophenols are the comparable derivatives with the substituent in the ortho position.

One may also employ disubstituted phenols, such as dibutylphenol, diamylphenol, dinonylphenol, etc., in which, generally speaking, one substituent appears in the ortho position and the other in the para position. One can employ also tri-substituted phenols in which both ortho positions and the para positions are occupied. Generally speaking, such phenols are comparatively expensive and, of course, are not ordinarily employed in the preparation of resins because they are nonreactive towards aldehydes. Stated another way, the glycidyl phenol ether can be obtained from a phenol which is a so-called hindred phenol or the type which is nonreactive towards formaldehyde.

Where the substituent radical can appear in more than one form, for instance, a secondary butyl or tertiary butyl radical, a secondary amyl or tertiary amyl radical, it is understood it is immaterial as to which particular substituted butyl phenol or amyl phenol is employed. This is true, also of other substituted phenols. The substituent radical may be unsaturated as in the case of a derivative of cardanol.

More specifically, in its preferred aspect my invention is concerned with the process of reacting (A) an oxyalkylation-susceptible, fusible, organic solvent-soluble, water-insoluble phenolaldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

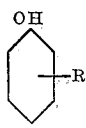

in which R is a hydrocarbon radical having at least 4 and not over 18 carbon atoms and substituted in the 2,4,6 position; and (B) a glycidyl phenyl ether of the formula

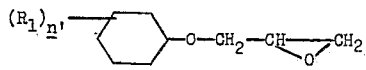

in which R₁ is a hydrocarbon radical having not over 18 carbon atoms and $n'$ represents a numeral not greater than 3 including 0; with the proviso that the reaction product be organic solvent-soluble; and said reaction between (A) and (B) being conducted below the pyrolytic point of the reactants and resultants of reaction.

Resins of the kind described in aforementioned U. S. Patent No. 2,499,368 serve as suitable reactants for use in the present invention. Such resins are reacted with glycidyl phenyl ether or substituted glycidyl phenyl ether of the kind previously described. The ratio employed is at least 2 moles of the ether per mole of resin, i. e., at least sufficient glycidyl phenyl ether to convert two hydroxyls per phenolic resin unit into the desired derivative. This phase of the invention will be described in greater detail subsequently. The product so obtained is susceptible for use in a variety of applications.

For purpose of convenience, what is said hereinafter will be divided into four parts:

Part 1 will be concerned with the preparation of suitable phenol-aldehyde resins;

Part 2 will be concerned with suitable glycidyl phenyl ethers;

Part 3 will be concerned with the reaction involving the phenol-aldehyde resin and the glycidylphenyl ether, and Part 4 will be concerned with uses for which the product, or products, described in Part 3 are particularly suitable.

PART 1

It is well known that one can readily purchase on the open market, or prepare, fusible, organic solvent-soluble, water-insoluble resin polymers of a composition approximated in an idealized form by the formula

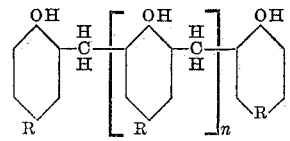

In the above formula $n$ represents a small whole number varying from 1 to 6, 7 or 8, or more, and in some instances as much as 10 or 12. As previously pointed out R represents a hydrocarbon radical having not over 24 carbon atoms and preferably represents an alkyl radical having 4 to 18 carbon atoms. Whereas the divalent radical bridge is shown as being derived from formaldehyde it may, of course, be derived from any other reactive aldehyde having 8 carbon atoms or less.

As previously stated, the preparation of resins of the kind herein employed as reactants, is well known. See previously mentioned U. S. Patent No. 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as .02% or as much as a few tenths of a per cent. Sometimes moderate amounts of caustic soda and caustic potash may be used. However, the most desirable procedure in practically every case is to have the resin neutral.

In preparing resins one does not obtain a single polymer, i. e., one having just 3 units, or just 4 units, or just 5 units, or just 6 units, etc. It is usually a mixture; for instance, one of approximately 4 phenolic nuclei will have some trimer and pentamer present. Thus, the molecular weight may be such that it corresponds to a fractional value for $n$ as, for example, 3.5, 4.5 or 5.2.

As has been pointed out previously, as far as the resin unit goes one can use a mole of aldehyde other than formaldehyde, such as acetaldehyde, propionaldehyde or butyraldehyde. The resin unit may be exemplified thus:

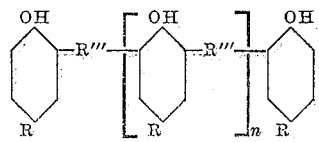

in which R''' is the divalent radical obtained from the particular aldehyde employed to form the resin. For reasons which are obvious the condensation product obtained appears to be described best in terms of the method of manufacture.

In the actual manufacture of the resins I found no reason for using other than those which are lowest in price and most readily available commercially. For purpose of convenience suitable resins are characterized in the following table:

Table I

| Example Number | R | Position of R | R''' derived from | n | Mol. Wt. of Resin Molecule (based on n+2) |
|---|---|---|---|---|---|
| 1a | phenyl | para | formaldehyde | 3.5 | 992.5 |
| 2a | tertiary butyl | do | do | 3.5 | 882.5 |
| 3a | secondary butyl | ortho | do | 3.5 | 882.5 |
| 4a | cyclohexyl | para | do | 3.5 | 1025.5 |
| 5a | tertiary amyl | do | do | 3.5 | 959.5 |
| 6a | mixed secondary and tertiary amyl | ortho | do | 3.5 | 805.5 |
| 7a | propyl | para | do | 3.5 | 805.5 |
| 8a | tertiary hexyl | do | do | 3.5 | 1036.5 |
| 9a | octyl | do | do | 3.5 | 1190.5 |
| 10a | nonyl | do | do | 3.5 | 1267.5 |
| 11a | decyl | do | do | 3.5 | 1344.5 |
| 12a | dodecyl | do | do | 3.5 | 1498.5 |
| 13a | tertiary butyl | do | acetaldehyde | 3.5 | 945.5 |
| 14a | tertiary amyl | do | do | 3.5 | 1022.5 |
| 15a | nonyl | do | do | 3.5 | 1330.5 |
| 16a | tertiary butyl | do | butyraldehyde | 3.5 | 1071.5 |
| 17a | tertiary amyl | do | do | 3.5 | 1148.5 |
| 18a | nonyl | do | do | 3.5 | 1456.5 |
| 19a | tertiary butyl | do | propionaldehyde | 3.5 | 1008.5 |
| 20a | tertiary amyl | do | do | 3.5 | 1085.5 |
| 21a | nonyl | do | do | 3.5 | 1393.5 |
| 22a | tertiary butyl | do | formaldehyde | 4.2 | 996.6 |
| 23a | tertiary amyl | do | do | 4.2 | 1083.4 |
| 24a | nonyl | do | do | 4.2 | 1430.6 |
| 25a | tertiary butyl | do | do | 4.8 | 1094.4 |
| 26a | tertiary amyl | do | do | 4.8 | 1189.6 |
| 27a | nonyl | do | do | 4.8 | 1570.4 |
| 28a | tertiary amyl | do | do | 1.5 | 604.0 |
| 29a | cyclohexyl | do | do | 1.5 | 646.0 |
| 30a | hexyl | do | do | 1.5 | 653.0 |
| 31a | hexyl | do | acetaldehyde | 1.5 | 688.0 |
| 32a | octyl | do | do | 1.5 | 786.0 |
| 33a | nonyl | do | do | 1.5 | 835.0 |
| 34a | octyl | do | butyraldehyde | 2.0 | 986.0 |
| 35a | nonyl | do | do | 2.0 | 1028.0 |
| 36a | amyl | do | do | 2.0 | 860.0 |
| 37a | butyl | do | formaldehyde | 2.0 | 636.0 |
| 38a | amyl | do | do | 2.0 | 692.0 |
| 39a | hexyl | do | do | 2.0 | 748.0 |
| 40a | cyclohexyl | do | do | 2.0 | 740.0 |

PART 2

Glycidyl phenyl ethers can be prepared in a variety of ways. At least one such product is available in commercial quantities. This is prepared from ordinary unsubstituted phenol i. e., hydroxybenzene. Any substituent phenol in which the substituent is a hydrocarbon substituent or the equivalent can be employed to produce a substituted glycidyl phenyl ether in the same way that phenol can be employed. The method of manufacture generally consists of treating the selected phenol, substituted or not, with epichlorohydrin and then with caustic so as to close the ring. In other instances the sodium phenolate is treated with epichlorohydrin. It is immaterial what procedure is employed to produce such phenolates. Glycerol dichlorohydrin also may be used.

Table II illustrates a number of suitable glycidyl phenyl ethers.

Table II

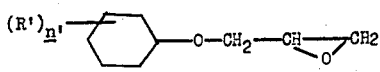

$n' = 0, 1, 2$ or $3$, and $R'$ is a hydrocarbon radical having not over 24 carbon atoms.

| Example Number | Substituent or Substituents and Position | | | Remarks |
|---|---|---|---|---|
| 1b | None | | | |
| 2b | methyl | p | | |
| 3b | ethyl | p | | |
| 4b | propyl | p | | |
| 5b | phenyl | p | | |
| 6b | tertiary butyl | p | | |
| 7b | secondary butyl | o | | |
| 8b | cyclohexyl | p | | |
| 9b | tertiary amyl | p | | |
| 10b | mixed secondary and tertiary amyl | o | | |
| 11b | propyl | p | | |
| 12b | tertiary hexyl | p | | |
| 13b | octyl | p | | |
| 14b | nonyl | p | | |
| 15b | decyl | p | | |
| 16b | dodecyl | p | | |
| 17b | phenyl | o | | |
| 18b | cyclohexyl | o | | |
| 19b | benzyl | p | | |
| 20b | propyl | p | methyl | m |
| 21b | butyl | p | do | m |
| 22b | amyl | p | do | m |
| 23b | hexyl | p | do | m |
| 24b | octyl | p | do | m |
| 25b | nonyl | p | do | m |
| 26b | dodecyl | p | do | m |
| 27b | propyl | p | propyl | o |
| 28b | butyl | p | do | o |
| 29b | amyl | p | do | o |
| 30b | hexyl | p | do | o |
| 31b | octyl | p | do | o |
| 32b | nonyl | p | do | o |
| 33b | dodecyl | p | do | o |
| 34b | propyl | p | $C_{15}H_{31}$ | m | (Obtained from hydrogenated cardanol.) |
| 35b | butyl | p | $C_{15}H_{31}$ | m |
| 36b | amyl | p | $C_{15}H_{31}$ | m |
| 37b | hexyl | p | $C_{15}H_{31}$ | m |
| 38b | octyl | p | $C_{15}H_{31}$ | m |
| 39b | nonyl | p | $C_{15}H_{31}$ | m |
| 40b | dodecyl | p | $C_{15}H_{31}$ | m |
| 41b | propyl | p | propyl | o | methyl...m. |
| 42b | butyl | p | butyl | o | Do. |

PART 3

In the broadest sense the phenyl glycidyl ethers previously described may be considered as special oxyalkylating agents as differentiated by ethylene oxide or the more common derivatives of ethylene oxide. This may be simplified by reference to an ordinary phenol which may or may not be substituted as in the instance of any one of the phenols previously described. Such phenol may be indicated thus:

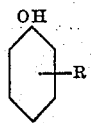

If reacted with ethylene oxide to produce the corresponding phenoxy ethanol the formula is thus:

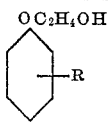

If reacted with a mole of propylene oxide the product is thus:

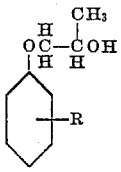

If the epoxide happened to be epichlorohydrin, the product would be thus:

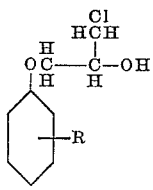

If, instead of the epichlorohydrin, one used the comparable compound, to wit, a glycidyl phenyl ether in which the chlorine atom of the epichlorohydrin was replaced by the phenoxy radical

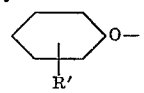

then the derivative becomes thus:

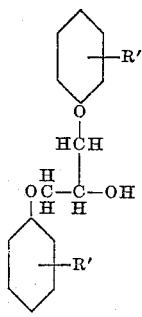

Needless to say, the phenolic nuclei having the substituent radical R' present may also represent an unsubstituted phenyl radical for reasons previously indicated.

Transposing this structure into the idealized form of a simplified resin the representation is thus:

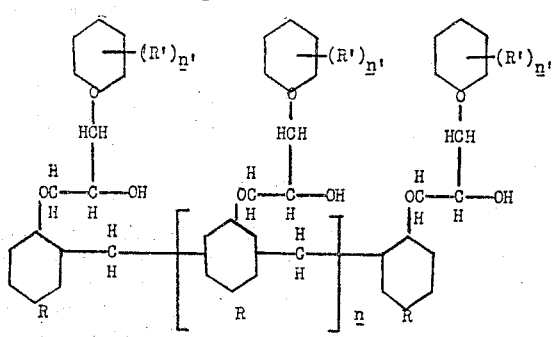

In the above presentation $n$ represents a small whole number varying from 1 to 10, and $n'$ represents a whole number varying from 0 to 3, R represents a hydrocarbon radical having not over 24 carbon atoms, and R' is the same as R with the proviso that R' also can be a hydrogen atom. It is to be noted that the divalent connective bridge radical is in essence the radical obtained by the removal of two hydrogen atoms from the two terminal methyl radicals of isopropyl alcohol, or perhaps more properly the two chlorine atoms from a glycerol dichlorohydrin. Such dichlorohydrin might be either the alpha-beta or the alpha-gamma dichlorohydrin.

This is illustrated by reference to a single unit, thus:

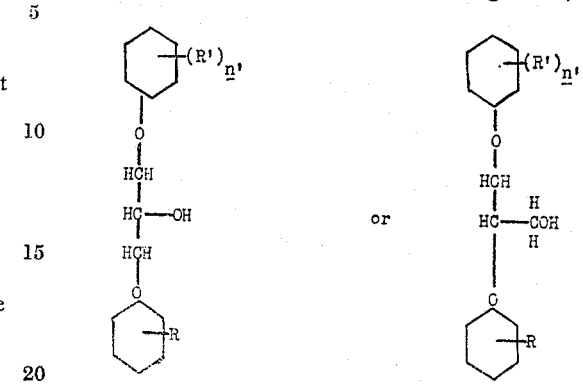

which may be summarized thus:

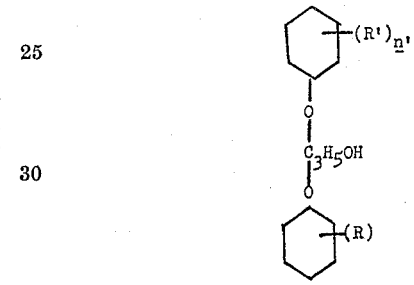

Using the latter representation, the resin molecule in an idealized over-simplification becomes:

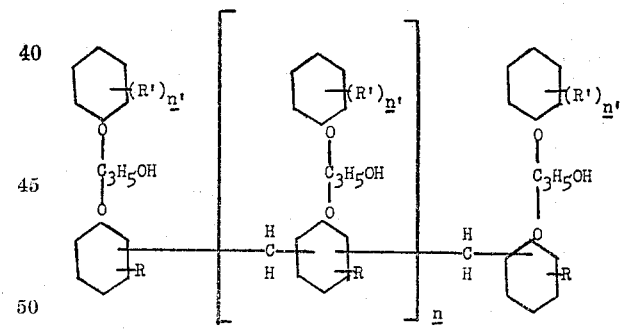

It is not necessary that the amount of phenyl or substituted phenyl glycidyl ether be used in stoichiometric amounts, i. e., one mole for each phenolic hydroxyl. One must employ at least two moles of the glycidyl ether per resin molecule and one preferably employs enough to convert a majority of the phenolic hydroxyl groups into the hydroxylated ether form. Stated another way, the preceding formula can be rewritten thus:

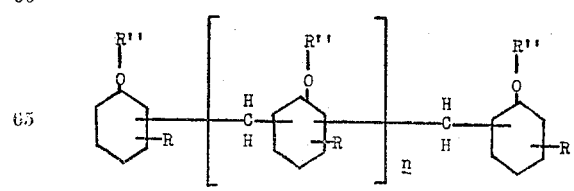

in which R'' is a member selected from the group consisting of hydrogen atoms, and the radical

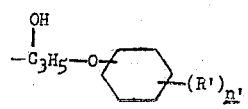

in which R' and n' have their previous significance and with the proviso that there must be at least two occurrences of the said last mentioned radical. Needless to say, when the methylene radical appears as a residue from the formaldehyde molecule any other divalent bridge radical, such as various substituted methylene bridges, may be used.

The amount of glycidyl phenyl ether employed may be as much as several moles, i. e., 2, 3, 4 or 5 moles per each hydroxyl radical present in the resin molecule. This limitation is not restricted to the external phenolic nuclei.

As previously indicated it is not necessary to add sufficient glycidyl phenyl ether or substituted glycidyl phenyl ether to convert all the hydroxyl radicals of the phenol-aldehyde resin into the corresponding derivatives. It is only necessary that two or more be so converted. If only two were converted and assuming that the two would be the hydroxyl radicals of the outside phenolic nuclei then the preceding formula would be presented thus:

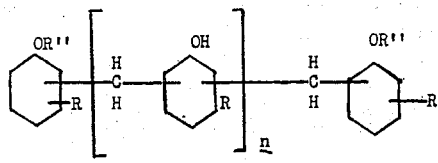

As a matter of fact, even where more than two moles of the glycidyl phenyl ether or substituted glycidyl phenyl ether are employed there is no proof that one would necessarily attack the hydroxyl radicals of the inner phenolic groups in preference to the more readily available external aliphatic hydroxyl groups. This is suggested merely by a theoretical consideration of steric hindrance.

This is illustrated by a reconsideration of a formula previously presented, to wit:

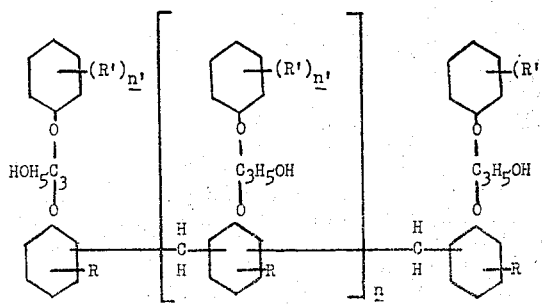

Modifying this formula to show the use of 2 moles of the glycidyl reactant initially it would appear thus:

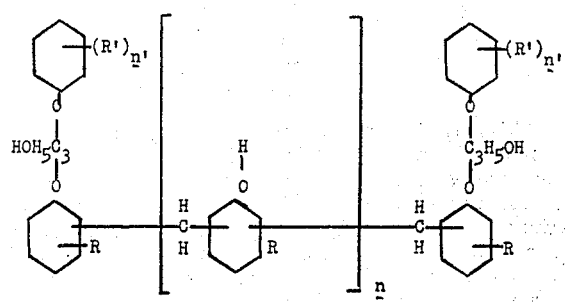

Additional moles of the glycidyl reactant may, as previously suggested and probably do at least in some instances attack the external aliphatic hydroxyl radicals, for instance, the next two moles of glycidyl reactant may enter the molecule thus:

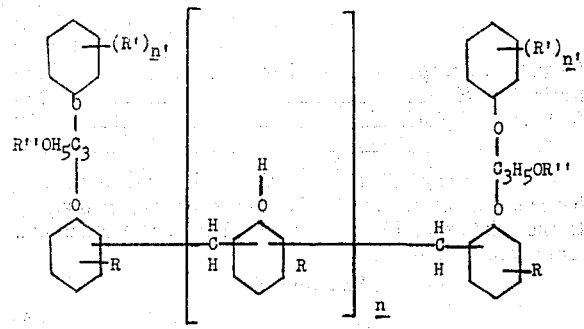

in which R'' has the significance previously indicated, i. e., is the radical

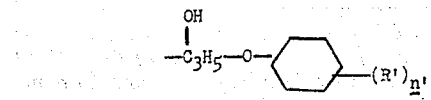

The glycidyl phenyl ethers act as epoxides in the same way as ethylene oxide, propylene oxide, butylene oxide, etc. The reaction may be catalyzed with the usual catalysts employed for such purposes, which include acidic catalysts as well as basic catalysts. My preference is to use an alkaline catalyst, such as finely powdered sodium methylate, caustic soda, caustic potash, or the like. The amount used varies from one-tenth per cent up to a few tenths per cent. More can be used if desired. If the resin employed as a reactant has been obtained by the use of an alkaline catalyst and the catalyst still remains, the amount of added catalyst required may be moderately less.

Since glycidyl phenyl ethers and all the substituted derivatives employed are either liquids or solids having comparatively low volatility at room temperature, one need not employ any special equipment. As a matter of fact, one can employ any of the usual apparatus used for resin manufacture of oxyalkylation with a non-volatile epoxide, such as glycide or methylglycide. For instance, one could use an apparatus such as the resin pot described in U. S. Patent No. 2,499,365, dated March 7, 1950, to De Groote and Keiser. The reaction is simply permitted to take place, usually in presence of a solvent, until the molecular weight determination or a test for epoxide radicals shows that the reaction is complete, or substantially complete. At the completion of the reaction there is, of course, no epoxide radical remaining. The following examples will illustrate the procedure.

EXAMPLE AA

This example will illustrate the preparation of a suitable end product from commercially available materials, such as a commercially available varnish resin, and commercially available glycidyl phenyl ether. The particular varnish resin selected was one identified as BR–4036, which was a light colored, low melting resin, manufactured by the Bakelite Corporation, Bloomfield, New Jersey, and derived from amylphenol and formaldehyde. It had an average of 3½ phenolic units per molecule and, for all practical purposes, corresponded almost identically with Resin 28a, previously described.

| | Grams |
|---|---|
| Glycidyl phenyl ether | 750 |
| Resin BR–4036 | 880 |
| Sodium methylate | 20 |
| Benzene | 1000 |

The mixture of BR–4036 and sodium methylate in benzene was heated to 60° C. The glycidyl ether was added gradually to the mixture. It took about ¼ hour to finish the addition. There was no apparent evolution of heat. The whole mixture was then heated for about 7 hours at a maximum temperature of 155° C.

EXAMPLE BB

| | Grams |
|---|---|
| Glycidyl isopropyl phenyl ether | 1160 |
| Resin BR–4036 | 350 |
| Sodium methylate | 30 |
| Benzene | 500 |

The mixture of Resin BR–4036, sodium methylate and benzene was heated to 58° C. The ether was then added to the mixture and heated about 9 hours, at a maximum temperature of 160° C.

EXAMPLE CC

| | Grams |
|---|---|
| Glycidyl amylphenol ether | 440 |
| Resin BR–4036 | 350 |
| Sodium methylate | 30 |
| Xylene | 1000 |

The mixture of BR–4036, sodium methylate and xylene was heated to about 70° C. The ether was then added to the mixture, and the whole heated for about 10 hours at a maximum temperature of 148° C.

Other examples prepared in instances where the amount of reactant available, particularly the substituted glycidyl ether, was limited are illustrated in the following table:

Table III

| Ex. No. | Resin Used | Amt. Used, grs. | Glycidyl ether | Amt. Used, gr. | Mol. Wt. of Resin | Probable OH Group in Resin Molec. | Molal ratio Glycidyl Ether to Resin Molec. | Solvent | Amt. Solvent Used, grs. | Sod. Meth. Used, grs. | Time of Reaction, hrs. | Max. Temp. of Reaction |
|---|---|---|---|---|---|---|---|---|---|---|---|---|
| 1c | 5a | 96 | 1b | 30 | 959.5 | 5.5 | 2:1 | Xylene | 100 | 1.2 | 5 | 160 |
| 2c | 5a | 96 | 1b | 83 | 959.5 | 5.5 | 5.5:1 | ...do... | 100 | 1.8 | 7 | 160 |
| 3c | 5a | 96 | 1b | 125 | 959.5 | 5.5 | 8.3:1 | ...do... | 100 | 2.2 | 10 | 160 |
| 4c | 5a | 96 | 1b | 165 | 959.5 | 5.5 | 11:1 | ...do... | 100 | 2.6 | 10 | 160 |
| 5c | 28a | 121 | 9b | 88 | 604 | 3.5 | 2:1 | ...do... | 100 | 2.1 | 8 | 150 |
| 6c | 28a | 60.4 | 9b | 77 | 604 | 3.5 | 3.5:1 | ...do... | 100 | 1.4 | 7 | 150 |
| 7c | 28a | 60.4 | 9b | 116 | 604 | 3.5 | 5.3:1 | ...do... | 100 | 1.8 | 8 | 150 |
| 8c | 28a | 60.4 | 9b | 154 | 604 | 3.5 | 7:1 | ...do... | 100 | 2.1 | 8 | 150 |
| 9c | 35a | 102.8 | 13b | 52.6 | 1028 | 4 | 2:1 | ...do... | 100 | 1.6 | 8 | 160 |
| 10c | 35a | 102.8 | 13b | 108.2 | 1028 | 4 | 4:1 | ...do... | 100 | 2.1 | 10 | 160 |
| 11c | 35a | 102.8 | 13b | 157.8 | 1028 | 4 | 6:1 | ...do... | 100 | 2.6 | 10 | 160 |
| 12c | 35a | 102.8 | 13b | 210.4 | 1028 | 4 | 8:1 | ...do... | 100 | 3.1 | 12 | 160 |
| 13c | 37a | 63.6 | 14b | 55.6 | 636 | 4 | 2:1 | ...do... | 100 | 1.2 | 6 | 160 |
| 14c | 37a | 63.6 | 14b | 111.2 | 636 | 4 | 4:1 | ...do... | 100 | 1.7 | 7 | 160 |
| 15c | 37a | 63.6 | 14b | 166.8 | 636 | 4 | 6:1 | ...do... | 100 | 2.3 | 10 | 160 |
| 16c | 37a | 63.6 | 14b | 222.4 | 636 | 4 | 8:1 | ...do... | 100 | 2.8 | 10 | 160 |

The resins which are employed as raw materials vary from fairly high melting resins to resins melting near the boiling point of water, to other products whose melting point is only moderately above ordinary room temperature. Such resins vary in color from almost water-white to products which are dark amber or reddish amber in appearance. In some instances they are tacky solids, or even liquids at ordinary temperatures. After treatment with a glycidyl ether of the kind herein employed the resultant product is usually at least as dark, perhaps darker, than the initial resin. The solvent can be removed readily by distillation, particularly vacuum distillation. The product obtained after treatment with the glycidyl ether is apt to be somewhat softer or more liquid than the original material. In some instances a tackiness develops which is suggestive of cross-linking in some obscure manner. Where the product is subsequently subjected to further reaction as described in Part 4 immediately following, there is nothing to be gained by removal of the solvent.

PART 4

Having obtained the modified phenol-aldehyde resins of the kind herein described they may be employed for various purposes, such as the manufacture of varnishes in the manner described in regard to ordinary phenol-aldehyde resins (prior to treatment with glycidyl ether) as described in U. S. Patent No. 2,610,955, dated September 16, 1952, to De Groote and Keiser; or they may be subjected to oxyalkylation, particularly with ethylene oxide or propylene oxide so as to produce derivatives suitable for the resolution of petroleum emulsions as described in U. S. Patent No. 2,499,365, dated March 7, 1950, to De Groote and Keiser; or they may be reacted with epoxides containing a basic nitrogen atom such as

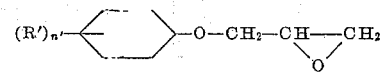

wherein R' and R" are alkyl groups, as described in U. S. 2,520,093, dated August 22, 1950, to Gross; or they may be reacted with imines such as ethylene imine or propylene imine to produce products which are valuable as cationic surface-active agents. Such last mentioned derivatives, i. e., those containing at least one basic nitrogen atom may, in turn, be reacted further with an alkylene oxide such as ethylene oxide or propylene oxide.

Having thus described my invention, what I claim as new and desire to secure by Letters Patent, is:

1. The process of conducting an oxyalkylation reaction between (A) a glycidyl phenyl ether of the structure $$(R')_{n'} - \langle \rangle - O - CH_2 - CH - CH_2 \atop O$$

wherein n' is an integer not exceeding 3 including zero and R' is a hydrocarbon radical having not over 24 carbon atoms, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

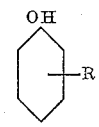

in which R is a hydrocarbon radical having not more than 24 carbon atoms and substituted in one of the positions ortho and para, with the proviso that there be employed at least 2 moles of the glycidyl ether for each mole of resin; and with the final proviso that the reaction product be organic solvent-soluble; and said reaction between (A) and (B) be conducted below the pyrolytic point of the reactants and resultants of reaction.

2. The process of claim 1 wherein R has at least 4 and not over 14 carbon atoms.

3. The process of claim 1 wherein R has at least 4 and not over 14 carbon atoms, and R' has at least 4 and not over 14 carbon atoms.

4. The process of claim 1 wherein R has at least 4 and not over 14 carbon atoms, R' has at least 4 and not over 14 carbon atoms, and $n'$ has a value of at least one and not greater than 2.

5. The process of claim 1 wherein R has at least 4 and not over 14 carbon atoms, R' has at least 4 and not over 14 carbon atoms, $n'$ has a value of at least one and not greater than 2, and the aldehyde employed in the manufacture of the resins is formaldehyde.

6. The process of claim 1 wherein R has at least 4 and not over 14 carbon atoms, R' has at least 4 and not over 14 carbon atoms, $n'$ has a value of one, and the aldehyde employed in the manufacture of the resin is formaldehyde.

7. The process of claim 1 wherein R has at least 4 and not over 14 carbon atoms, R' has at least 4 and not over 14 carbon atoms, $n'$ has a value of one, the aldehyde employed in the manufacture of the resin is formaldehyde, and the resin itself has an average molecular weight corresponding to at least 3 and not over 7 phenolic nuclei per resin molecule.

8. The process of claim 1 wherein R is alkyl and has at least 4 and not over 14 carbon atoms, R' has at least 4 and not over 14 carbon atoms, $n'$ has a value of one, the aldehyde employed in the manufacture of the resin is formaldehyde, and the resin itself has an average molecular weight corresponding to at least 3 and not over 7 phenolic nuclei per resin molecule.

9. The process of claim 1 wherein R is alkyl and has at least 4 and not over 14 carbon atoms, R' is alkyl and has at least 4 and not over 14 carbon atoms, $n'$ has a value of one, the aldehyde employed in the manufacture of the resin is formaldehyde, and the resin itself has an average molecular weight corresponding to at least 3 and not over 7 phenolic nuclei per resin molecule.

10. The product obtained by the process described in claim 1.

11. The product obtained by the process described in claim 8.

References Cited in the file of this patent

UNITED STATES PATENTS

| | | |
|---|---|---|
| 2,131,120 | Schlack | Sept. 27, 1938 |
| 2,581,367 | De Groote et al. | Jan. 8, 1952 |